UNITED STATES PATENT OFFICE.

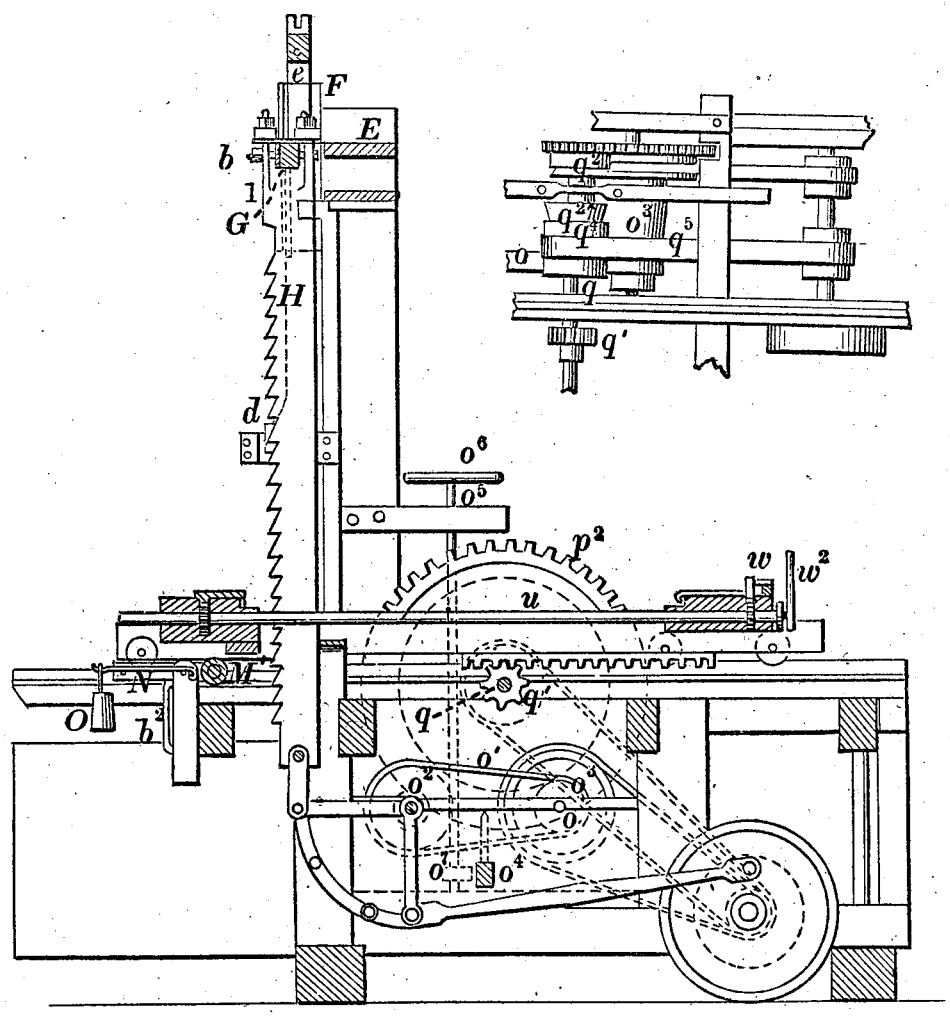

CALEB BOND, OF RICHMOND, INDIANA.

IMPROVEMENT IN SAW-MILLS.

Specification forming part of Letters Patent No. 44,069, dated September 6, 1864.

*To all whom it may concern:*

Be it known that I, CALEB BOND, of Richmond, in the county of Wayne and State of Indiana, have invented a new and Improved Saw-Mill; and I do hereby declare that the following is a full, clear, and exact description thereof, which will enable others skilled in the art to make and use the same, reference being had to the accompanying drawings, forming a part of this specification, in which—

Figure 1 represents a longitudinal central section of this invention; Fig. 2, a horizontal section of the same; Fig. 3, a detached front elevation of the saw-guide; Fig. 4, a detached sectional view of the weighted roller supporting the log; Fig. 5, a horizontal section of the lower connection of the saw; Fig. 6, a detached sectional plan of one of the head-blocks.

Similar letters of reference indicate like parts.

This invention relates to certain improvements in the mode of hanging the saw, so that its pitch can be adjusted at pleasure; also, to certain improvements in the manner of placing and adjusting the guides to prevent the saw from trembling or springing; further, to an improved mode of guiding and supporting the log, and to a sliding friction-clutch, in combination with suitable levers and wheels, to run the carriage in either direction by power or by hand, as the operator may desire.

A represents the frame-work which supports the ways B for the carriage C, and from which rise two uprights, D, which are steadied by suitable braces and connected at the top by cross-bars E, which are placed a short distance apart, as clearly shown in Fig. 1 of the drawings. Secured to the front edge of these cross bars are the guides F, for the upper slide or cross-head, G, and the saw H is secured to this cross-head by a clamp, I, of peculiar construction. It consists of two arms rising from the edges of the saw on either side of the cross-head, and connected on top by a strap, $a$. The space between the arms of the clamp exceeds in width the width of the cross-head; and a set-screw, $b$, which passes through the front arm of the clamp and is tapped in the cross-head, serves to adjust the saw backward or forward, so that its pitch can be increased or diminished at pleasure.

Two guides, $c$, are secured to the under surface of the lower cross-bar, E, and these guides bear on the rear edge of said saw and assist in keeping the same steady and prevent it from trembling. The saw is further steadied by two spring-guides, $d$, which are secured to the inner surfaces of arms $e$, that extend down from the upper guides, F. (See Fig. 3.) These arms are connected on top and bottom by suitable cross-pieces, and they are or may be so arranged that they can be moved up or down between the guides F, and that the guides $d$ can be brought to bear on the sides of the saw close over the log to be cut. Suitable screws serve to set the guides up to the saw. Two jaws, $d'$, secured to the top of the lower guides, F', serve to steady the saw below the log.

The lower end of the saw is connected to a cross-head, G', moving between the guides F', and it forms a socket to receive one end of the link J, the opposite end of which is pivoted to the arm $g$ of the bell-crank lever $g$ $h$. The ends of the two arms of this bell-crank lever are connected by a segmental brace, in order to strengthen them, and it (the bell-crank lever) has its fulcrum on a horizontal shaft, $f$, having its bearings in the lower part of the frame A. The arm $h$ of the same connects by a pitman, $i$, with the eccentric wrist-pin $j$, projecting from the face of a disk, $k$, which is rigidly attached to the end of the driving shaft $l$.

A belt running on the pulley $m$, which is firmly keyed to said driving shaft, serves to impart motion to the saw and to the various working parts of the machine.

A belt, $n$, which extends from a pulley, $n'$, on the driving-shaft over a pulley, $n^2$, on the secondary shaft $o$, gives motion to the feed apparatus. The motion of the shaft $o$ is transmitted by a belt, $o'$, to the shaft $p$, and the motion of this shaft is transmitted by the action of the pinion $p'$ and cog-wheel $p^2$ to the shaft $q$, which extends under the carriage C, and to which a pinion, $q'$, is firmly keyed. This pinion gears in a toothed rack attached to the under side of one of the longitudinal beams of the carriage in the usual manner. The cog wheel $p^2$ revolves loosely on its shaft, and it is rendered rigid with the same by a friction-clutch, $q^2$, which slides on the shaft, and which is operated by the hand-lever $q^3$. The shaft $q$ also bears a pulley, $q^4$, to which motion is imparted by a belt, $q^5$, stretched over a pulley, $q^6$, on the driving-shaft. The pulley $q^4$ rotates loosely on the shaft $q$, and its motion is in a direction opposite to that of the cog-wheel $p^2$. It is rendered rigid by the action of the friction-clutch $q^{2*}$, which is operated by the hand lever $q^3$, and which is connected to the clutch $q^2$, so that either of the two clutches is brought in action, or that both may be thrown out of gear. If the clutch $q^{2*}$, is thrown in gear with the pulley $q^4$, the cog-wheel $p^2$ remains stationary, and the shaft $q$ turns in the direction of the arrow marked on it in Figs. 1 and 2, and the carriage is gigged back. If the clutch $q^2$ is in gear with the cog-wheel $p^2$, the shaft $q$ turns in the direction opposite to the arrow marked thereon, and the carriage is moved against the saw.

The belt $o'$, which transmits the motion from the shaft $o$ to the shaft $p$, runs on the cone-pulleys $o^2$ $o^3$, and a belt-shipper, $o^4$, serves to govern its position on these pulleys. This belt-shipper extends through the frame to that side generally occupied by the sawyer, and by its action on the belt $o'$ the sawyer is enabled to regulate the speed of the feed motion. The belt-shipper is operated by a vertical shaft, $o^5$, which bears a hand-lever, $o^6$, on its top and a pinion, $o^7$, on its bottom end. Said pinion gears in a toothed rack on the side of the belt-shipper, so that by turning the hand-wheel the sawyer is enabled to move the belt-shipper in either direction.

The shaft $q$ extends through the side of the frame, and it bears a hand-wheel, $q^7$, so that by throwing the clutch $q^2$ $q^{2*}$ out of gear with the cog-wheel $p^2$ and with the pulley $q^4$ the sawyer is enabled to gig back and to feed by hand, if circumstances should render it desirable.

The log is supported by two head-blocks, L L', one of which is rigidly attached to the carriage, while the other is adjustable thereon in the usual manner. Each of these head-blocks is provided with a slide, $r$ $r'$, running in grooves $s$ $s'$, and these slides are operated by pinions $t$ $t$, gearing in the toothed racks on the under sides of the slides. The pinions $t t$ are mounted on a shaft, $u$, which may be square or otherwise arranged in such a manner that it slides freely through said pinions, but compels the same to rotate with it in whatever position it may be brought. By this shaft both slides are moved simultaneously, and said slides are provided with lugs or lips $v$ $v'$, which bear against the log, so that by turning the shaft a lateral motion is imparted to the log. The amount of this lateral motion governs the thickness of the boards to be sawed, and in order to determine this thickness at a glance the head-block L' is provided with a graduated scale, $w$, Fig. 6, and an index, $w'$, on the slide $r'$ indicates the amount of motion imparted to the log in a lateral direction. The shaft $u$ is operated by a hand-lever, $w^2$, which turns loosely on its end, and which is armed with a pawl, $w^3$, that engages with the teeth of the ratchet-wheel, $w^4$, which is firmly keyed to the shaft $u$.

In order to steady the log in front of the saw, a roller, M', is secured in a frame, N, which swings on a pivot, $a^2$, as clearly shown in Fig. 4 of the drawings. From the outer end of the swinging frame a weight, O, is suspended, so that by the action of this weight the roller is pressed up against the under side of the log. The weight O is connected to the swinging frame N by means of an arm, $a^3$, which is so arranged that it can be shifted in and out, and that the leverage of the weight can be increased or diminished, as may be desired.

When the swinging frame N is raised, a spring-stop, $b^2$, catches under it and prevents the weight from bearing against the under side of the log. This spring-stop can be withdrawn by the action of a hand-lever, $b^3$, which is placed within convenient reach of the sawyer.

By these various devices the sawyer has complete control over the machine from his stand, the saw is steadied, and the thickness of the cut can be gaged to any desired point.

Having thus described my invention, I claim as new and desire to secure by Letters Patent—

1. The application of the clamp I and set-screw $b$, in combination with the cross-head G of the saw H, substantially as herein specified, so that by the action of said set-screw the pitch of the saw can be adjusted.

2. The vertically-adjustable spring-guides $d$, in combination with the arms $e$ and saw H, constructed and operating substantially as and for the purpose set forth.

3. The sliding friction-clutch $q^2$ $q^{2*}$, in combination with the pulley $q^4$, cog-wheel $p^2$, shaft $q$, and hand-wheel $q^7$, applied substantially as herein specified, so that the carriage can be moved in either direction by hand or by power, as may be desirable.

4. The hand-wheel $o^6$ on the vertical arbor $o^5$, in combination with the belt-shipper $o^4$, cone-pulleys $o^2 o^3$, and belt $o'$, applied substantially as herein set forth, so that the sawyer is enabled by turning the hand-wheel to regulate the feed.

5. The swinging frame N, roller M, and weight O, in combination with the spring-stop $b^2$ and hand-lever $b^3$, constructed and operating substantially as and for the purpose set forth.

CALEB BOND.

Witnesses:
WILLIAM BELL,
S. L. HITTLE.